United States Patent
Brown et al.

(10) Patent No.: US 10,846,471 B2
(45) Date of Patent: Nov. 24, 2020

(54) ARTIFICIAL INTELLIGENCE AND CROWDSOURCED TRANSLATION PLATFORM

(71) Applicant: FinancialForce.com, Inc., San Francisco, CA (US)

(72) Inventors: Daniel Christian Brown, San Francisco, CA (US); Stephen Paul Willcock, Harrogate (GB); Andrew Craddock, San Francisco, CA (US); Luke McMahon, San Francisco, CA (US); Peter George Wright, San Francisco, CA (US)

(73) Assignee: FinancialForce.com, Inc., San Francisco, CA (US)

( * ) Notice: Subject to any disclaimer, the term of this patent is extended or adjusted under 35 U.S.C. 154(b) by 198 days.

(21) Appl. No.: 16/027,207

(22) Filed: Jul. 3, 2018

(65) Prior Publication Data
US 2020/0012717 A1    Jan. 9, 2020

(51) Int. Cl.
| | | |
|---|---|---|
| *G10L 15/18* | (2013.01) | |
| *G06F 40/205* | (2020.01) | |
| *G06F 40/284* | (2020.01) | |

(52) U.S. Cl.
CPC ........ *G06F 40/205* (2020.01); *G06F 40/284* (2020.01); *G10L 15/1815* (2013.01)

(58) Field of Classification Search
CPC .................................................. G10L 15/1815
See application file for complete search history.

(56) References Cited

U.S. PATENT DOCUMENTS

| | | | |
|---|---|---|---|
| 2004/0102956 A1* | 5/2004 | Levin | G06F 40/49 704/2 |
| 2009/0204386 A1* | 8/2009 | Seligman | G06F 40/268 704/2 |
| 2009/0248393 A1* | 10/2009 | Tomko | G06F 9/454 704/3 |
| 2009/0281789 A1* | 11/2009 | Waibel | G06F 40/40 704/3 |

\* cited by examiner

*Primary Examiner* — Feng-Tzer Tzeng
(74) *Attorney, Agent, or Firm* — Kokka & Backus, PC (57) ABSTRACT

Disclosed herein is a translation platform making use of both machine translation and crowd sourced manual translation. Translation is performed on pages in an application. Manual translations are applied immediately to local versions of the client application and are either human reviewed or reverse machine translated and compared against the original text. Once verified, the translations are applied to all end-clients.

20 Claims, 11 Drawing Sheets

ARTIFICIAL INTELLIGENCE AND CROWDSOURCED TRANSLATION PLATFORM

TECHNICAL FIELD

The disclosure relates to translation of text between languages. The disclosure more particularly relates to the combination of machine translation and crowdsourced human translation.

BACKGROUND

Applications are designed to be consumed by a global audience. To meet that global audience, applications are designed to be translated into multiple languages. Translating many lines of text is a tedious activity. Machine translation presents an efficient method to translate large portions of text into many languages; however, machine translation is prone to generating numerous translation errors that cause an unprofessional look and feel to applications.

DETAILED DESCRIPTION

Disclosed herein is a translation platform making use of both machine translation and crowd sourced manual translation. A set of text is first translated using a machine translation process, then is subjected to user corrections. Translation is performed on resource files within in an application. The end-client application includes a graphic user interface that enables the user to submit corrections to select portions of text. Manual translations are applied immediately to local versions of the client application and are either human reviewed or reverse machine translated and compared against the original text. Once verified, the translations are applied to all end-clients.

Figure 1:
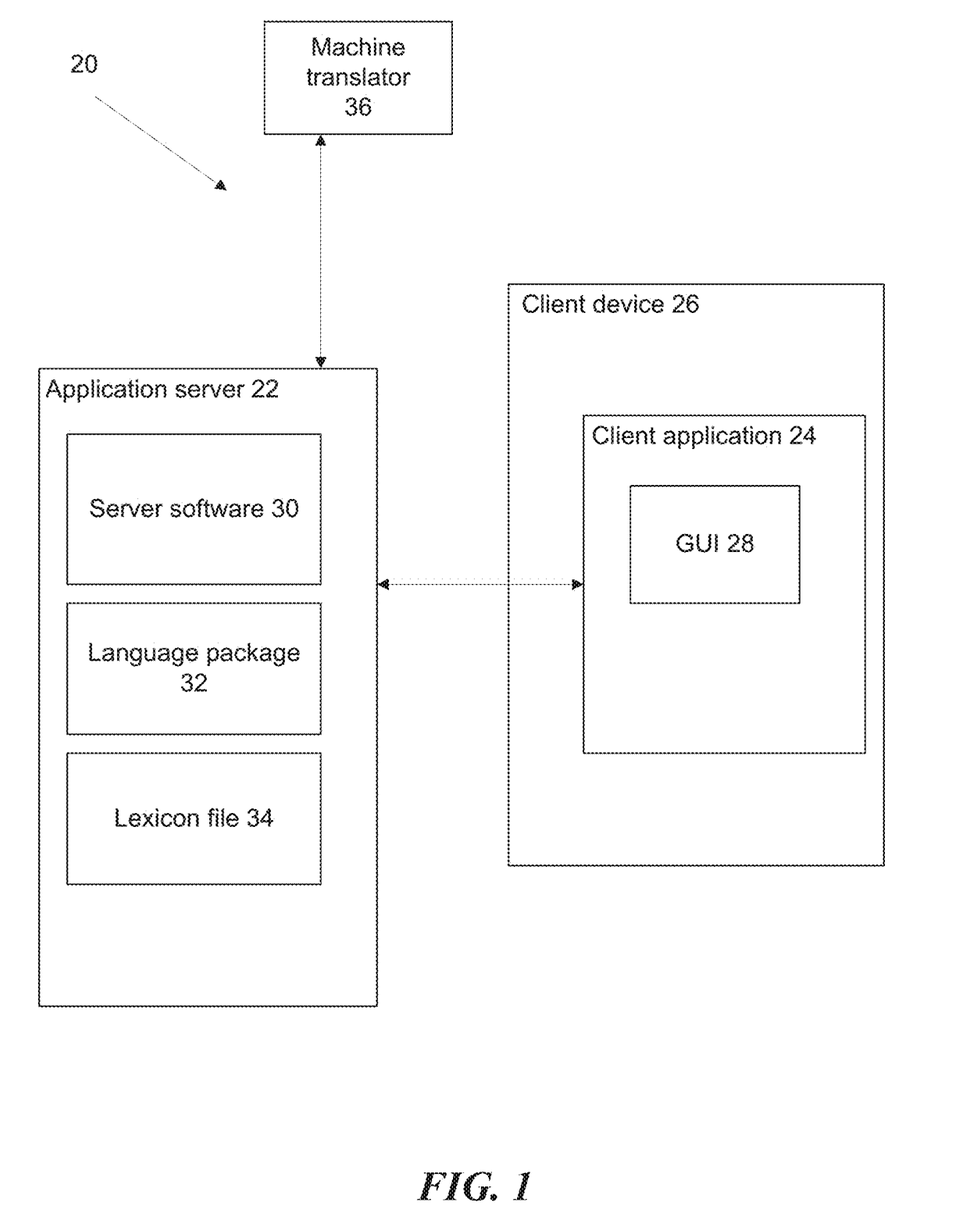
FIG. 1 is an illustrative block diagram of an application translation network.

FIG. 1 is an illustrative block diagram of an application translation network 20. In some embodiments, an application translation network 20 includes an application server 22 and a client device 26. The client application 24 is executed on a client device 26. The client application 24 further includes a graphic user interface 28. The client application 24 and the application server 22 communicate with one another. The application server 22 includes server software 30 that provides backend support for the client application 24.

The applications server 32 further includes language packages 32 to support multiple language displays of individual client applications 24. In some embodiments, the language packages 32 are stored with/part of the client application 24. The applications server further includes a lexicon file 34. The machine translation service 36 may be a system operating on the application server 22, or is a service that the users of the application server 22 do not have administrator access to.

The lexicon file 34 is an instructional file for a machine translation service 36. The lexicon file 34 includes instructions to translate particular words (especially industry specific or highly technical terms) in a certain manner in various languages. The lexicon file 34 may be a domain specific dictionary that includes idioms, or terms that do not literally translate well. For example, in drafting contracts, the English language refers to routine or generic language as "boilerplate". Boilerplate does not translate literally in many other languages. At the time of this disclosure, Google Translate machine translates "boilerplate" into Spanish as "repetitivo" ("Repetitive" in English). A more accurate translation of "boilerplate" into Spainish is "texto estandarizado." The lexicon file 34 includes relevant industry/technical term translations that the machine translation service 36 can use to more effectively translate.

In operation the application translation network 20 operates the client application 24 on end user devices 26 and is supported by the application server 22 as a backend. The given application content and purpose may vary, and at a minimum, includes translatable text. For example, the client application 24 may be a game, a social network, accounting software, business flow software/enterprise software, or even a combination thereof. The client software 24 includes a setting to adjust the language of text of pages (and by extension, resource files therein) within the application 24. When a user toggles the language setting the client application accesses the relevant language pack 32 (for the selected language). The language pack 32 is initially populated by a machine translation of the original text of the application page. In some embodiments, the machine translation is influenced by the lexicon file 34.

Figure 2A:
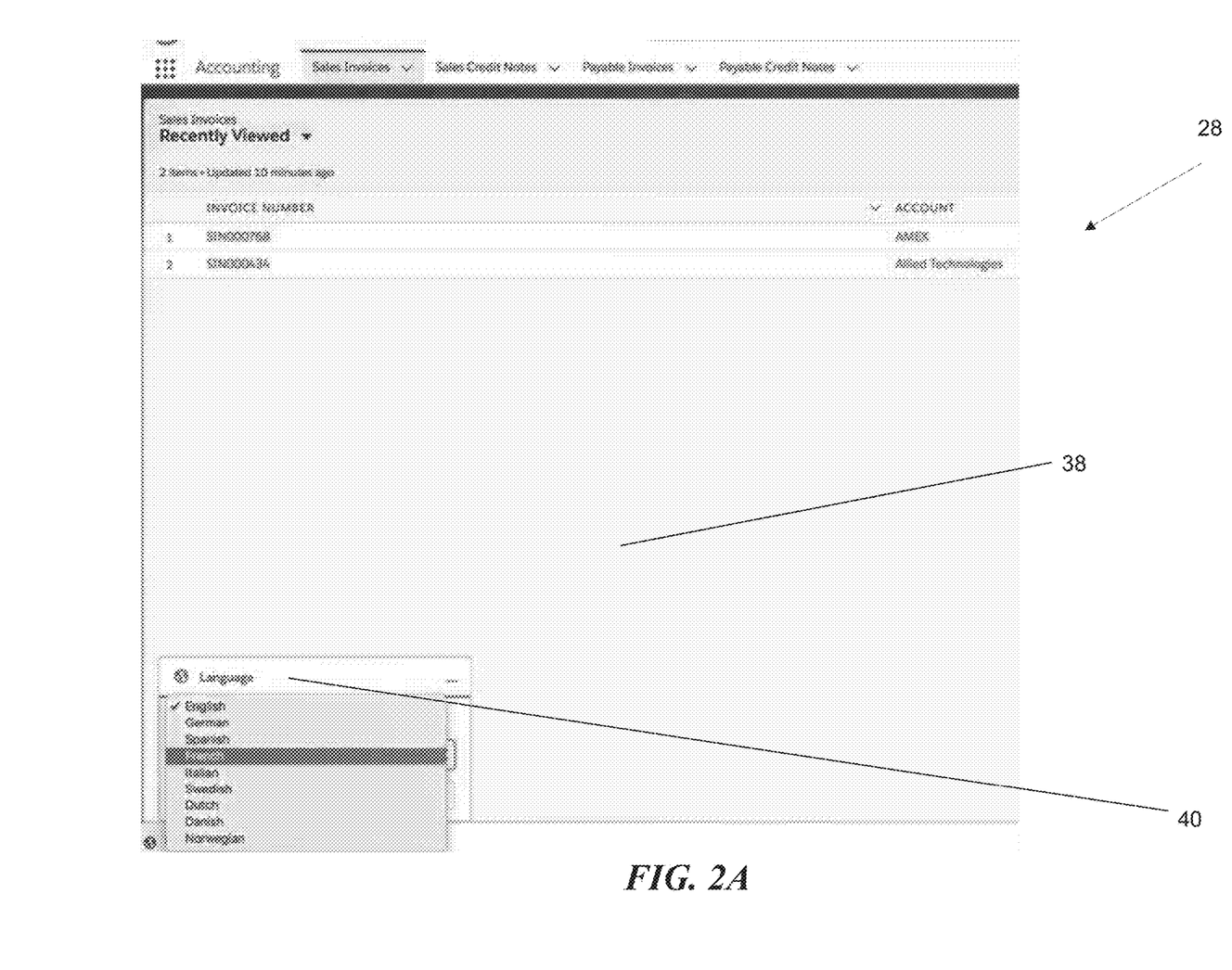
FIGS. 2A and 2B are depictions of a graphic user interface control to change an application language.
Figure 2B:
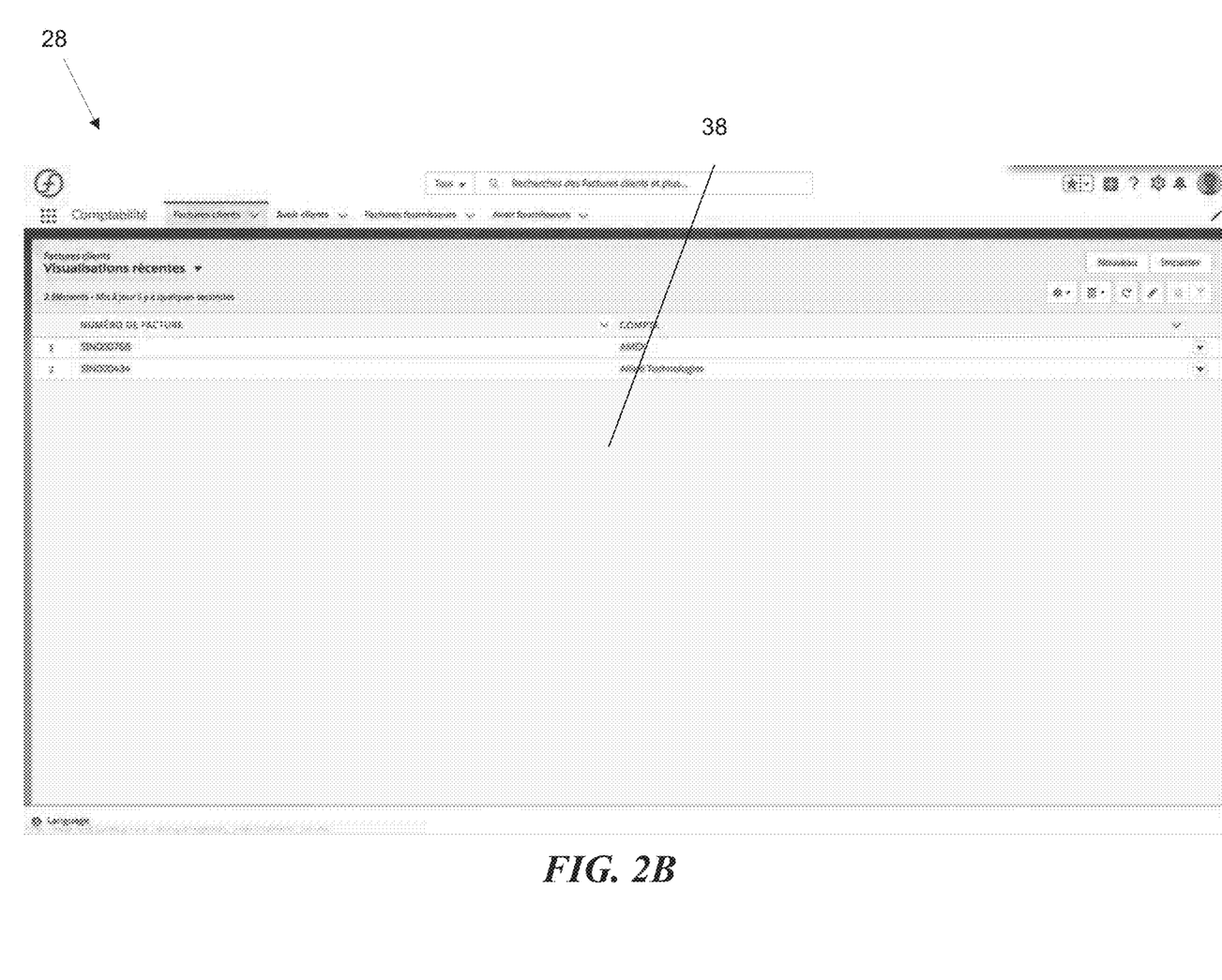

FIGS. 2A and 2B are depictions of a graphic user interface 28 control to change an application language. FIG. 2A displays an application page 38 in a first language (English) and a language control interface 40. The figure displays the language being switched from the first language (English) to a second language (French). FIG. 2B displays the same page after the language has been shifted to the second language (French).

Figure 3A:
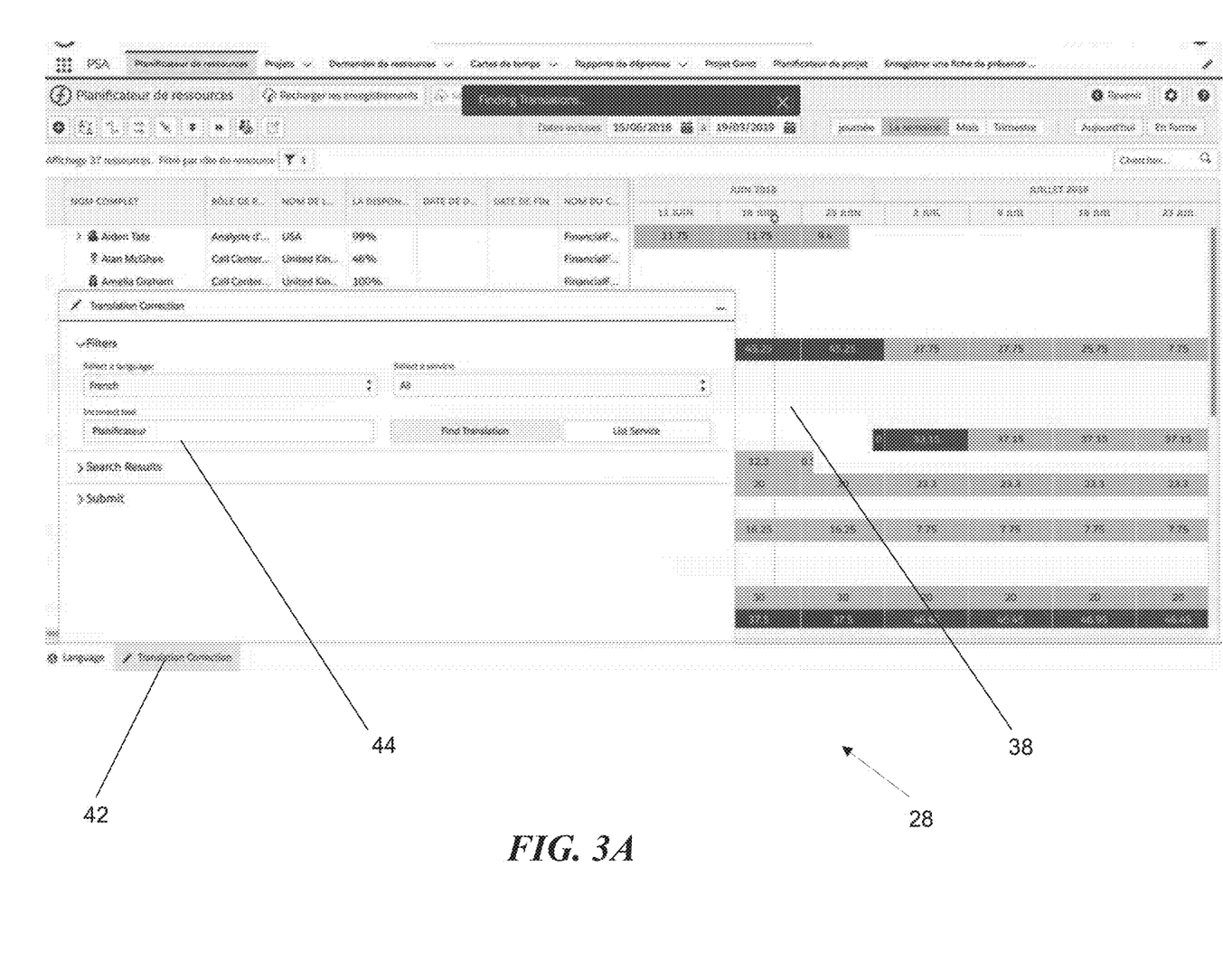
FIGS. 3A, 3B and 3C are depictions of a graphic user interface control to correct errors in machine translation.
Figure 3B:
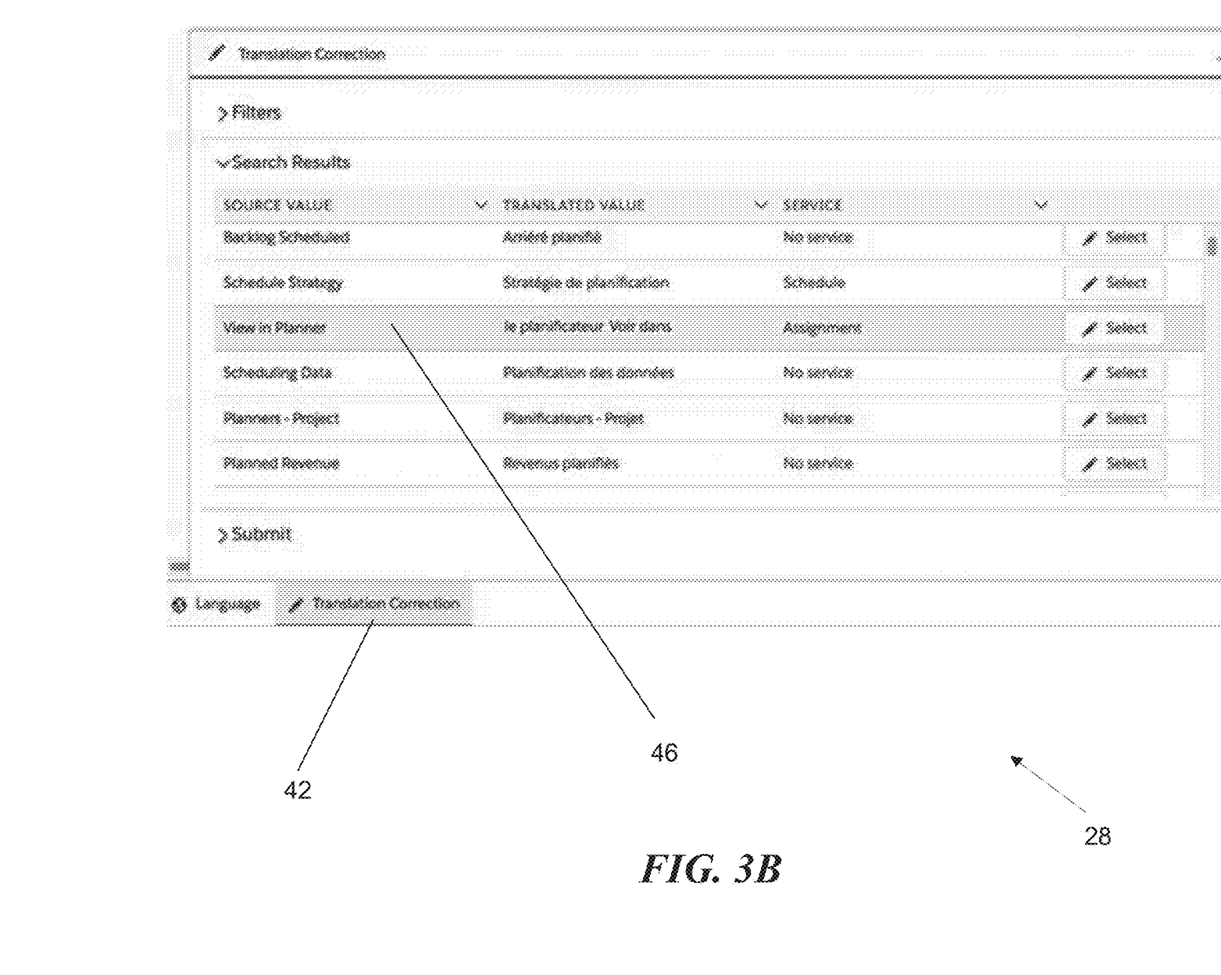
Figure 3C:
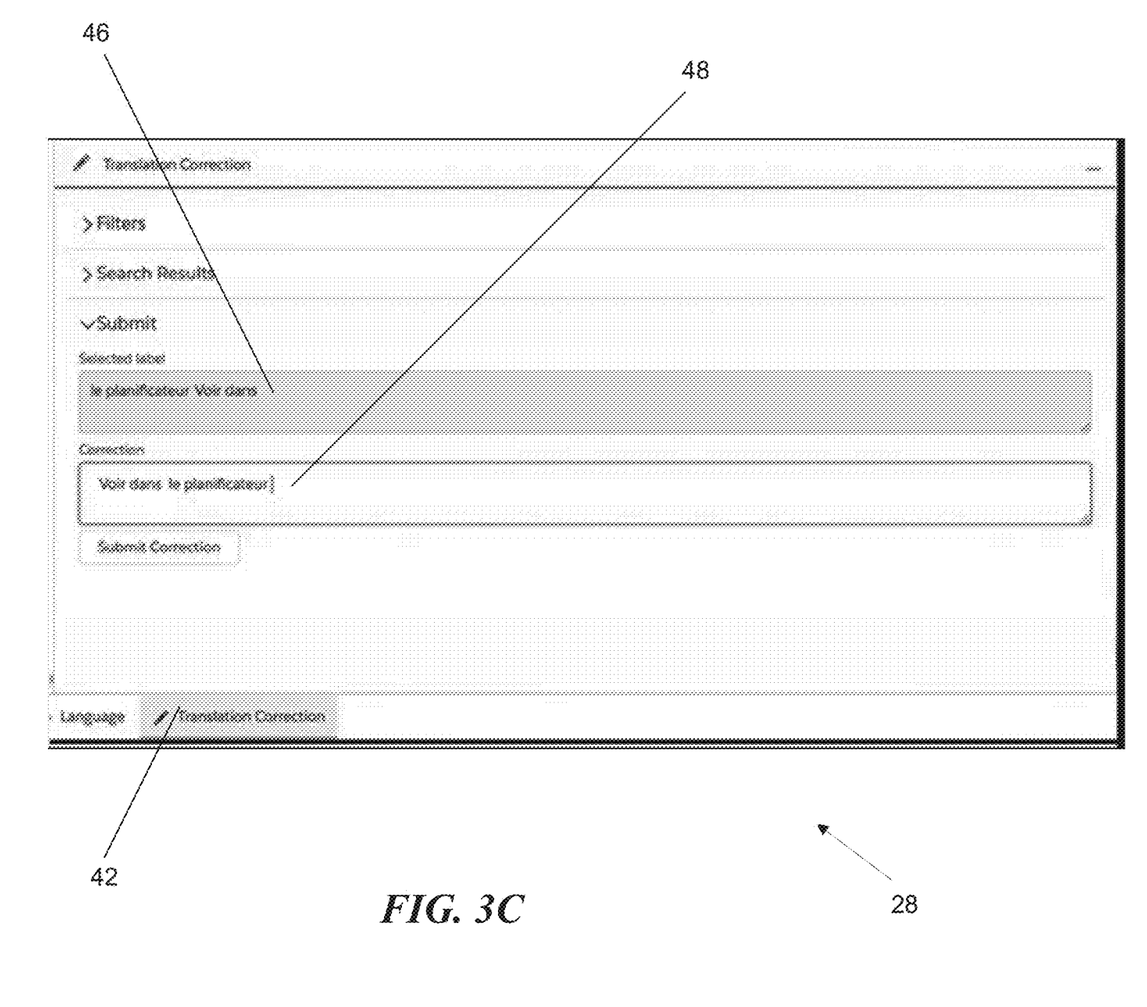

FIGS. 3A, 3B and 3C are depictions of a graphic user interface 28 control to correct errors in machine translation. In some circumstances, machine translation is not accurate and appears unprofessional. Proper syntax, grammar, and word choice improve the quality of a software application. Accordingly, the graphic user interface 28 includes a translation correction control 42. When activated, the user is able to correct the machine translation of some or all of the application page 28.

FIG. 3A depicts a first portion of a translation control 42. In the first portion, a keyword field 44 enables the user to enter a phrase or keywords that appear within the application page 28 (e.g., included within resource files of the application). When the user executes on the input in the keyword field 44, the translation correction control 42 shifts to a second portion. In the second portion a list of results displays each instance of the keyword or phrase entered in the keyword field 44. Using the list of results, the user selects the erroneous passage 46 including the keyword or phrase. Displayed in the figures, the keyword selected is "Planificateur" (French for "planner"). The erroneous passage 46 is "le planificateur voir dans." Shown with the erroneous passage 46 is the original phrase pre-machine translation, "View in Planner". The inclusion of the original text enables the reader to see the intent of the passage to determine whether the machine translated passage is correct.

In the given example, the original English phrase is not a complete sentence and thus machine translation is often complicated. In some embodiments, the grammar of machine translation improves with additional original text. The completeness of a sentence or passage influences the accuracy of some machine translation engines.

In FIG. 3C, a third portion of the translation correction controls 42 is shown. The third portion includes a correction field 48 where the user is enabled to enter a manual correction for the erroneous passage 46. In the figure's example, the correction reverses the arrangement of the verb and noun. Once executed, the local version of the client application 24 is updated and the correction is displayed instead of the erroneous passage 46.

Figure 4:
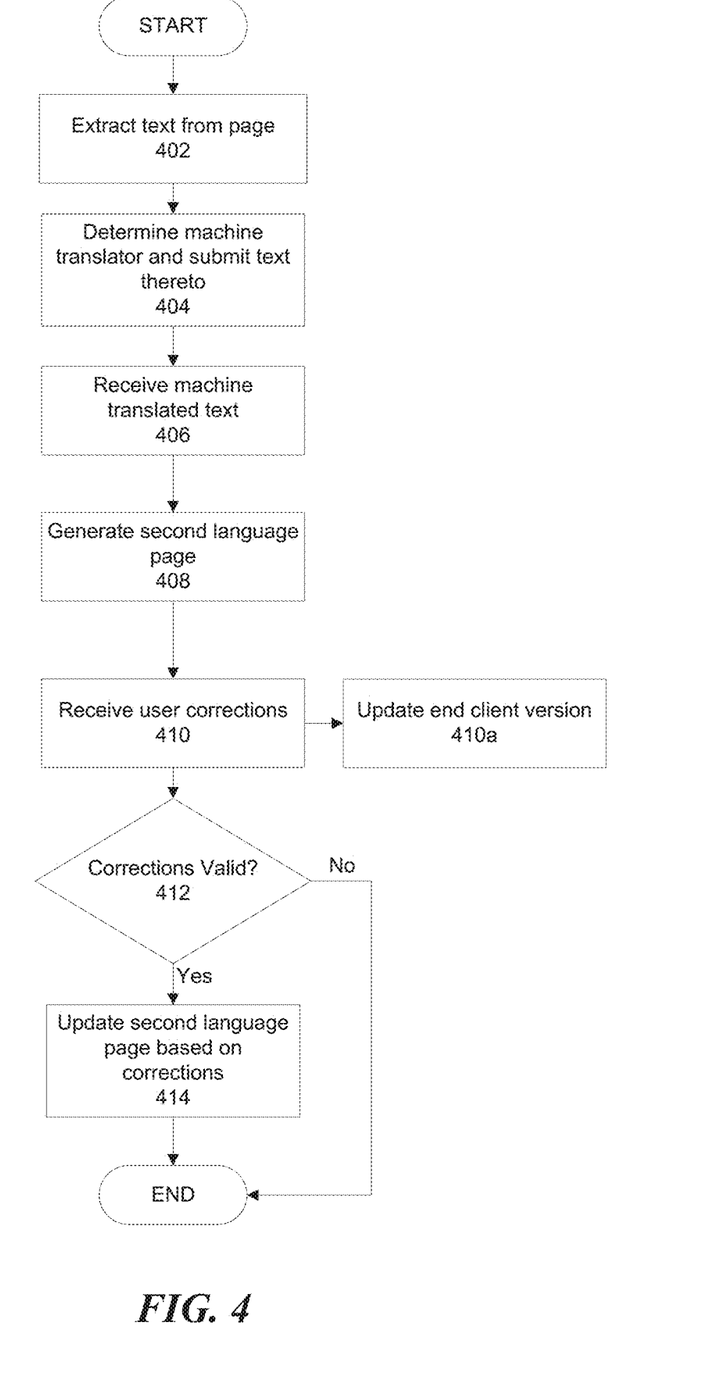
FIG. 4 is a flowchart illustrating a two-tier translation.

FIG. 4 is a flowchart illustrating a two-tier translation. In step 402, the application server extracts resource files (including text) from a page of the application. Text may be extracted in segments or as a whole page depending on how the page is structured. In some embodiments, where a page includes a number of frames or labeled buttons/tabs the text is individually extracted from each. The extraction of text may be performed through the use of resource files. Resource files include the text relevant to the page. For example, if a given page of an application is displaying a message from one use to another, or an email, a resource file contains the text of that message or email. When text is extracted, the system keeps track of the text's mapped location on each page in order to later replace corresponding text in the same location.

In step 404, the application server submits the extracted text to a machine translation service. There are a number of machine translation services available. Many are freely accessible on the Internet. Examples include services offered by Google and IBM Watson. The machine translator used may vary based on the text itself. Prior to submission to the translator, the application server analyzes the extracted text segment. Analysis may include word count and/or inclusion of terms included in the lexicon file. Some machine translators function better than others when the content of the text to be translated is longer. The inclusion of additional context improves the ability of the AI used to translate. Some machine translators function better than others when a lexicon file can be effectively applied to the particular text segment. Thus, a machine translator is chosen based on the result of the analysis of the extracted passage of text. The machine translator used is predetermined based on various potential outcomes of the analysis. The analysis may use thresholds and/or pattern matching to arrive at an outcome.

In step 406, The application server receives the translated text from the machine translator. In step 408, The application server generates a second version of the application page from which the extracted text was from. The second version uses the machine translated text placed in the same location as the corresponding text in the original language. In some embodiments, the steps 402-406 are performed a number of times prior to the performance of step 408 in order to machine translate each string of text on the first version of the application page. The second version of the page is navigated to within the client application in the same manner as the first page. The primary distinction between the first and second version of the page is the translated text. In some embodiments, the second version of the page includes the translation of less than all text fields/resource files in a given page.

In step 410, a user of a client application submits corrections to the machine translated text of the second page to the application server. The submitted corrections may pertain to all or part of text or text segments of the second page. The corrections are transmitted from the end-client application to the application server backend. Step 410*a* occurs simultaneously and out of band with the application server. When the user supplied corrections through the user interface of the client application, the client application immediately applies the corrections to that particular user's client application.

In step 412, the application server determines whether the corrections are valid. Determination of validity may be made via human inspection or machine validation. Human inspection includes receipt by an administrator of the application server. Machine validation may include a reverse translation process. Reverse translation includes machine translating the correction back into the original language (for example, from French back into English) and then conducting a comparison to the original text. Machine validation may further use a confidence score for corrections based on a number of criteria such as: the number of identical submissions for the same correction from different participants, the number of accepted submissions from a participant, the strength and nature of the relationship with the participant, and the reverse translation comparison already included in the draft.

Where the corrections are validated, in step 414, the application server applies the corrections across all instances of the second version of the application page (in the second language). In some embodiments, certain local versions of the client application will not update. The original submitter of the correction will not require an update because the user already updated their own local version (during step 410*a*). Additionally, some users may deactivate updates in application settings. In this manner, the machine translations are updated by the user base of the client application.

In some embodiments, the users whom are able to submit corrections are limited to those within a predetermined class of higher tier users. Some users of the client application may have more permissions than other users. Permissions may pertain to the ability to correct language.

Deferring the quality control of translations onto the client applications is an improvement to the processing efficiency of the system. Client application translation correction relies on cloud computing principles in order to defray the computational cost of translations.

Figure 5:
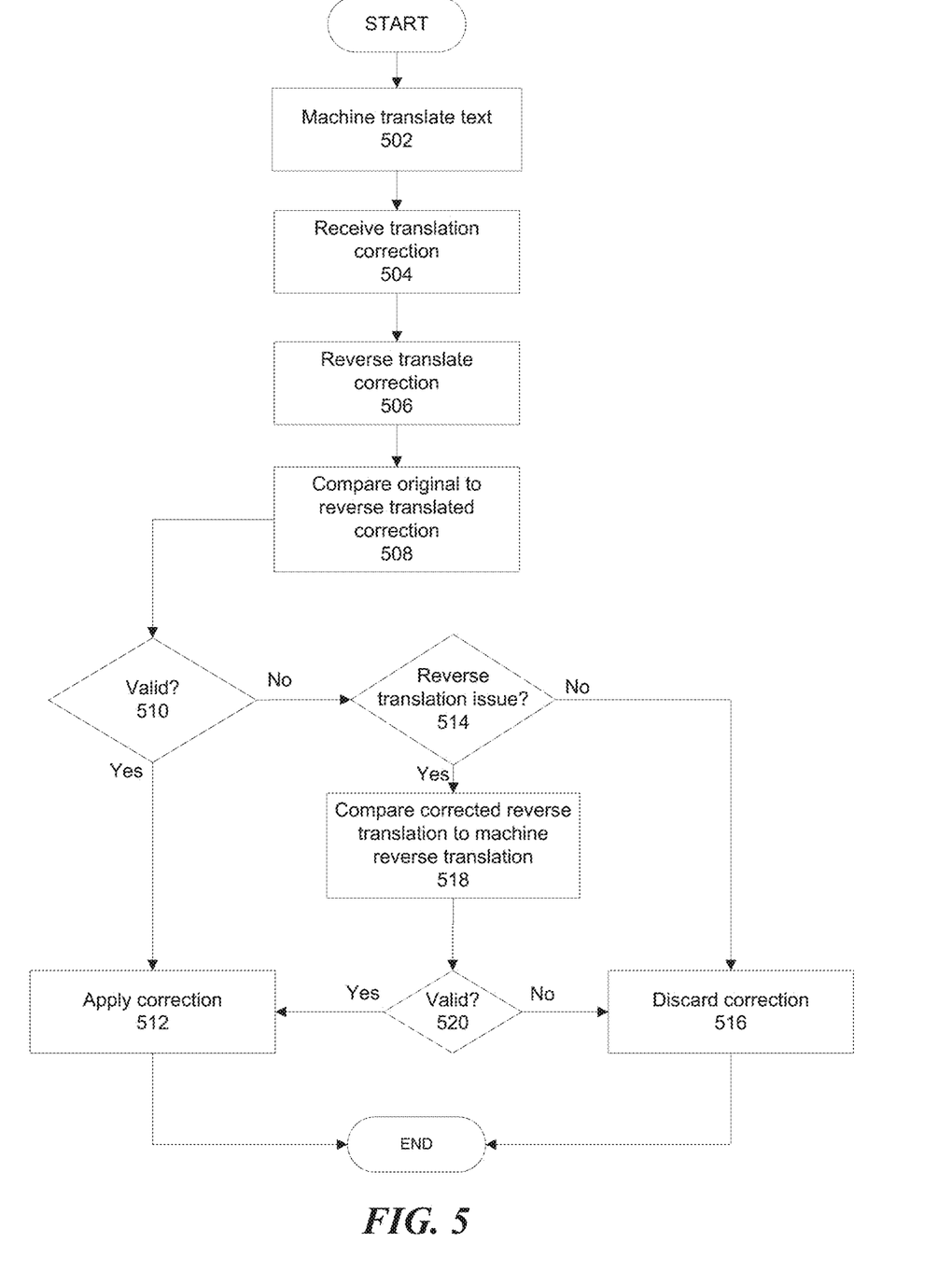
FIG. 5 is a flowchart illustrating reverse translation verification.

FIG. 5 is a flowchart illustrating reverse translation verification. Reverse translation verification is performed in step 414 of FIG. 4. In step 502, text is first machine translated from a first language to a second language. In step 504, the application server receives a correction to the machine translated text in the second language. In step 506, the application server submits the correction to a machine translator from the second language back to the first language.

In step 508, the application server compares the result of step 506 with the original text from the first language. The comparison uses character thresholds to determine a degree of accuracy between the reverse translated text and the original text. In some embodiments the character match threshold analyzes both the inclusion of characters and the positioning of those characters. Analysis of positioning determined on a per word basis (e.g., the order of the words "and anaconda" as opposed to "anaconda and" rather than that location of the letter A throughout each word). The strings should ideally match. In step 510, the application server determines whether the correction is valid based on the comparison of the reverse translated correction to the original text. If the correction is valid based on the result of step 508, then in step 512, the correction is applied across the application server.

Where the determination of step 510 is invalid, an additional layer of comparison is performed. In step 514, the application server determines if there is a potential reverse translation issue present. In some cases, words don't translate directly.

For example, in English, the finger after the middle finger is referred to as the "ring finger" (as this is the finger a wedding ring is traditionally worn on). In Russian, that same finger is literally called the "unnamed finger." When first translated, ring finger becomes the Russian word for unnamed finger (Безымянный палец). When reverse translated back into English, the result is "unnamed finger." The result will not pass a comparison test. Thus, the ring finger example, as well as many others (there is also no word for "toe" in Russian), will cause a reverse translation issue. In order to evaluate whether a reverse translation issue exists, the application server machine translates the original text to the second language and then reverse machine translates (e.g., without any human correction).

If the result of the machine reverse translation does not match the original, there is a reverse translation issue. Where there is no reverse translation issue, in step 516, the corrections are discarded at the backend server level. In some embodiments, the corrections are also removed from the submitting user's end-client application.

Where a reverse translation issue is detected, in step 518, the application server compares the result of the reverse translation of the original and the reverse translation of the correction. The application server assumes that there will be greater variation between the two results and between the comparison of step 508. The variation is a result of the necessity of a correction in the first place. The correction ostensibly occurred because the machine translation from the original was incorrect. The comparison of step 518, performs both a character match threshold, and a thesaurus analysis. A thesaurus analysis compares whether the result of the reverse translation of the corrected text includes synonyms of the pure machine translation and reverse translation of the original text. Identification of synonyms increases a match threshold score. With respect to the character match threshold comparison of step 518, the application server only compares the presence of the characters and not the positioning.

In step 520, the application server determines the validity of the correction based on the comparison of step 518. Where the correction is invalid based on the step 518 analysis, in step 516, the correction is discarded.

Figure 6:
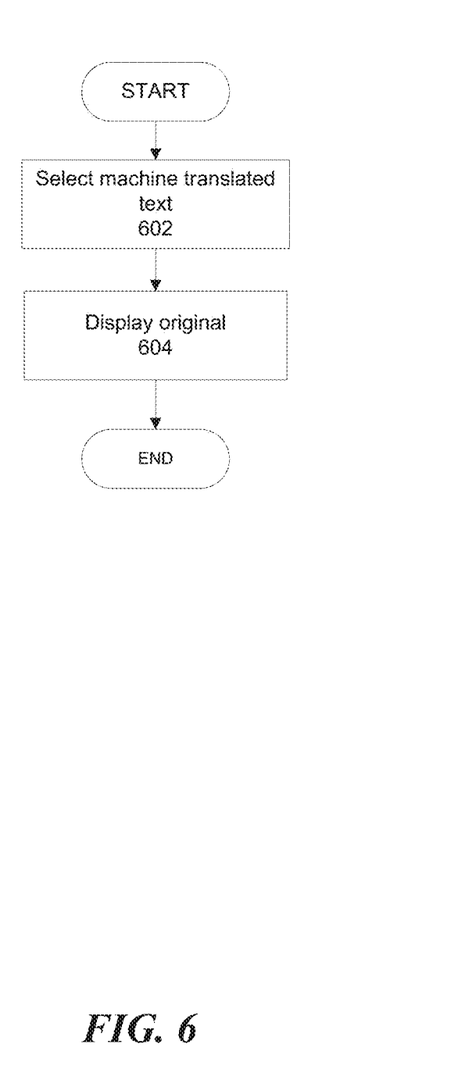
FIG. 6 is a flowchart illustrating the display of text to guide correctors.

FIG. 6 is a flowchart illustrating the display of text to guide correctors. In some cases, machine translation may be so bad that the reader is unable to discern what the original intent of the text was. However, often users are bilingual and use translated versions merely out of preference. In such cases, displaying the original text in the original language enables a user to better perform corrections of the translation. Thus, in step 602, a user selects a segment of translated text. The selection of text varies based on the character of the client application. For example, selection of text may be performed with a mouse selection and a secondary click that opens up an action menu. In another example, selection may include typing the relevant text into a correction window. In still other embodiments, the bounds of a selection may be determined by contextual clues. For example, if a user clicks/taps/points at a word in a sentence, the client application may select the whole sentence (e.g., period to period). In step 602, the selected text is displayed in the original language. The display may replace the machine translated text with the original text entirely, or display additional text that comprises the original adjacent to the machine translated text.

Figure 7:
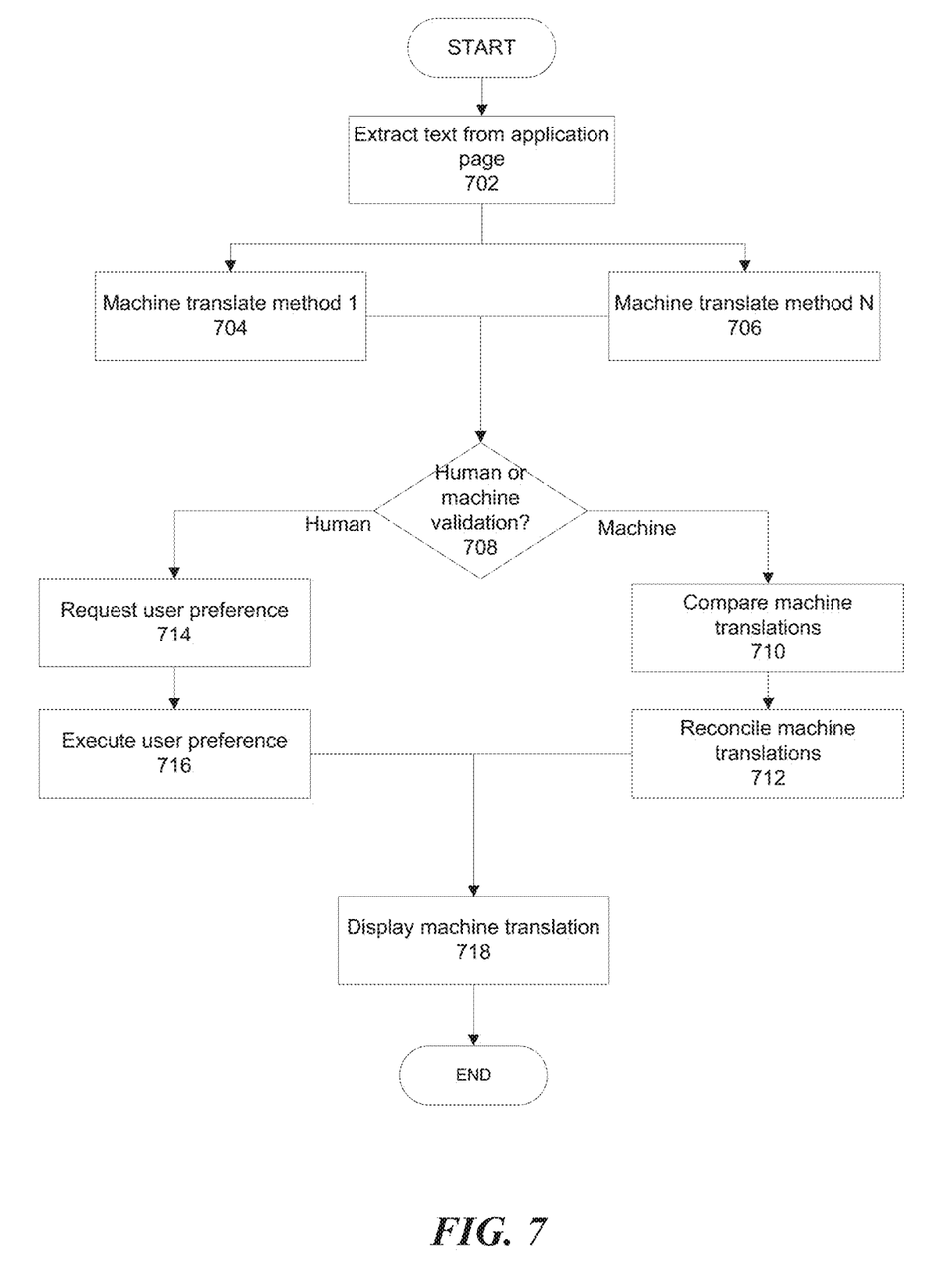
FIG. 7 is a flowchart illustrating a composite machine translation technique.

FIG. 7 is a flowchart illustrating a composite machine translation technique. A composite machine translation is where multiple machine translations are used in order to arrive at a final machine translation result. In FIG. 4, step 404 concerned the determination of a particular machine translation service. The result of step 404 (and step 502 of FIG. 5) may be to use multiple machine translation services. The technique illustrated in FIG. 7 should not be construed as being limited to steps 404 and 502 of FIGS. 4 and 5 respectively. In some embodiments, the technique of FIG. 7 is connected to a number of associated steps in other illustrated portions of the present disclosure.

In step 702, the application server extracts text from the application page. In step 704 the application server submits the extracted text to a first machine translation service. Concurrently, in step 706, the application server submits the same extracted text to other machine translation services (a second service, a third service, up to the Nth service). Different machine translation services may have varied effectiveness at varied segments of text. Within the same segment of text different machine translation services may function at varying levels of accuracy.

In step 708, the application server determines a method to validate the various output of the N machine translations services. Based on application server settings and functionality, the machine translation output is validated by human input or a fully automated process.

Where the application server makes use of a fully automated process, in step 710, the application server compares the N machine translations. The comparison of the machine translations includes the use of a word processor to determine the readability of the machine translated text. The word processor assigns a confidence score to each machine translation and each portion of the machine translation therein. Where a majority of the machine translations are in agreement the confidence score is high. Where the word processor detects grammatical errors, the confidence level is low. The word processor further uses natural language processing to determine whether a word is out of place. For example, where an adjective appears when a noun is expected, confidence in the machine translation is lower.

In step 712, the various machine translations are reconciled into a single, composite machine translation. Reconciliation of machine translations may use the entirety of a single machine translation or pick and choose portions of multiple machine translations to assemble a single machine translation with the highest machine confidence. During the reconciliation of the multiple machine translations, an additional word processor analysis is performed on the composite translation in order to prevent the introduction of new errors during compositing. Where the word processor detects new grammatical or contextual errors, the word processor implements a correction using natural language processing.

Where the application server makes use of human validation, in step 714, the application server or end-client application displays multiple machine translations to a user either individually or side-by-side. The user interface requests that the user select a preference. In some embodiments, the user preference may be stored and automatically applied in the future. In step 716, the application server executes the user's preference for a current passage of text. In some embodiments, the application server or the client application may apply the same preference on other passages of text that are machine translated.

In step 718, regardless of how the composite machine translation is arrived upon, the system displays the machine translation of the application page to the user.

Figure 8:
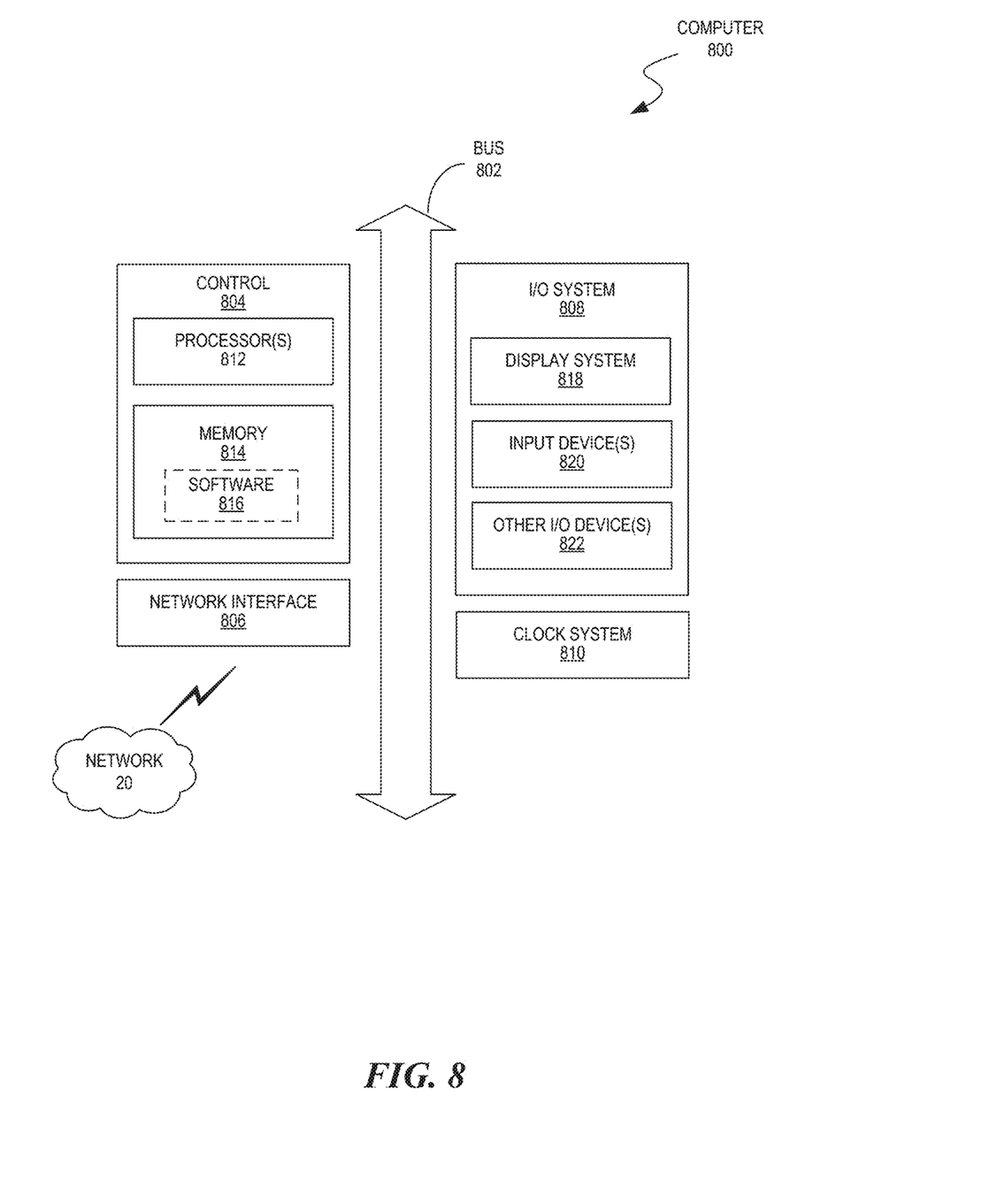
FIG. 8 is a block diagram of a computer operable to implement the disclosed technology according to some embodiments of the present disclosure.

FIG. 8 is a block diagram of a computer 800 operable to implement the disclosed technology according to some embodiments of the present disclosure. The computer 800 may be a generic computer or specifically designed to carry out features of translation system 20. For example, the computer 800 may be a system-on-chip (SOC), a single-board computer (SBC) system, a desktop or laptop computer, a kiosk, a mainframe, a mesh of computer systems, a handheld mobile device, or combinations thereof.

The computer 800 may be a standalone device or part of a distributed system that spans multiple networks, locations, machines, or combinations thereof. In some embodiments, the computer 800 operates as a server computer or a client device in a client-server network environment, or as a peer machine in a peer-to-peer system. In some embodiments, the computer 800 may perform one or more steps of the disclosed embodiments in real time, near real time, offline, by batch processing, or combinations thereof.

As shown in FIG. 8, the computer 800 includes a bus 802 that is operable to transfer data between hardware components. These components include a control 804 (e.g., processing system), a network interface 806, an input/output (I/O) system 808, and a clock system 810. The computer 800 may include other components that are not shown nor further discussed for the sake of brevity. One who has ordinary skill in the art will understand elements of hardware and software that are included but not shown in FIG. 7.

The control 704 includes one or more processors 812 (e.g., central processing units (CPUs)), application-specific integrated circuits (ASICs), and/or field-programmable gate arrays (FPGAs), and memory 814 (which may include software 816). For example, the memory 814 may include volatile memory, such as random-access memory (RAM), and/or non-volatile memory, such as read-only memory (ROM). The memory 714 can be local, remote, or distributed.

A software program (e.g., software 816), when referred to as "implemented in a computer-readable storage medium," includes computer-readable instructions stored in the memory (e.g., memory 814). A processor (e.g., processor 812) is "configured to execute a software program" when at least one value associated with the software program is stored in a register that is readable by the processor. In some embodiments, routines executed to implement the disclosed embodiments may be implemented as part of an operating system (OS) software (e.g., Microsoft Windows® and Linux®) or a specific software application, component, program, object, module, or sequence of instructions referred to as "computer programs."

As such, the computer programs typically comprise one or more instructions set at various times in various memory devices of a computer (e.g., computer 800), which, when read and executed by at least one processor (e.g., processor 812), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 814).

The network interface 806 may include a modem or other interfaces (not shown) for coupling the computer 800 to other computers over the network 20. The I/O system 808 may operate to control various I/O devices, including peripheral devices, such as a display system 818 (e.g., a monitor or touch-sensitive display) and one or more input devices 720 (e.g., a keyboard and/or pointing device). Other I/O devices 722 may include, for example, a disk drive, printer, scanner, or the like. Lastly, the clock system 720 controls a timer for use by the disclosed embodiments.

Operation of a memory device (e.g., memory 824), such as a change in state from a binary one (1) to a binary zero (0) (or vice versa) may comprise a visually perceptible physical change or transformation. The transformation may comprise a physical transformation of an article to a different state or thing. For example, a change in state may involve accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A method comprising:
extracting a passage of text in a first language from a first page;
submitting the passage of text to a machine translation engine configured to generate a machine translated text in a second language based on the passage of text, the submitting the passage of the text including parsing the passage of text for length and inclusion of words from a redetermined list, and determining the machine translation engine to use for the passage of text from a plurality of machine translation engines based on the length of the passage of text and the inclusion of words from a predetermined list;
receiving the machine translated text in the second language;
generating a second language page matching the first page wherein the passage of text is replaced by the machine translated text;
receiving, by an administrator server, user input including corrections to at least a portion of the machine translated text; and
in response to an administrator authorization, updating, by the administrator server, the machine translated text on the second language page based on the corrections.

2. The method of claim 1, further comprising:
submitting a lexicon file to the machine translation engine configured to affect generation of the machine translated text wherein a predetermined set of words contained within the passage of text are machine translated to corresponding terms indicated by the lexicon file.

3. The method of claim 1, further comprising:
receiving user input on the second language page that identifies a specific segment of the machine translated text; and
reverting the specific segment of the machine translated text on the second language page to a corresponding segment from the passage of text in the first language.

4. The method of claim 1, wherein the second page is navigated to in the client application through a same manner as the first page while a language setting is set to the second language.

5. A method comprising:
submitting a passage of text, in a first language, extracted from a first page of a client application to a machine translation engine, the machine translation engine configured to return a machine translated text in a second language based on the passage of text, the submitting the passage of the text including parsing the passage of text for length and inclusion of words from a predetermined list, and determining the machine translation engine to use for the passage of text from a plurality of machine translation engines based on the length of the passage of text and the inclusion of words from a predetermined list;
generating a second page in the client application matching the first page wherein the passage of text is replaced by the machine translated text returned from the machine translation engine;
correcting, by the client application, the machine translated text in a local version of the second page based on user input entered into a user interface of the second page of the client application; and
transmitting, by the client application, the user input to a backend server associated with the client application.

6. The method of claim 5, wherein the second page is navigated to in the client application through a same manner as the first page while a language setting is set to the second language.

7. The method of claim 5, wherein the local version of the second page is:
stored locally on a client device; or
stored on the backend server and associated with a specific user account.

8. The method of claim 5, further comprising:
submitting, by the backend server, the user input, to the machine translation engine configured to translate from the second language to the first language and return a reverse translated text; and
in response to satisfaction of a character match threshold between the reverse translated text and the passage of text, updating the machine translated text in a system wide version of the second page based on the user input.

9. The method of claim 8, wherein the system wide version of the second page does not include any of:
the local version; or
other local versions of client applications that have automatic updates disabled.

10. The method of claim 5, further comprising:
submitting a lexicon file to the machine translation engine configured to affect generation of the machine translated text wherein a predetermined set of words contained within the passage of text are machine translated to corresponding terms indicated by the lexicon file.

11. The method of claim 5, further comprising:
receiving a user selection on the second page that identifies a specific segment of the machine translated text; and
reverting display of the specific segment of the machine translated text in the second language on the second page to a corresponding segment from the passage of text in the first language.

12. The method of claim 5, wherein the machine translated text is a composite translation of, wherein the composite translation is based on combined portions of output of multiple machine translation engines.

13. The method of claim 5, wherein the machine translated text is a selected from output of a number of machine translators by user preference.

14. A system comprising:
a processor operated application server configured to submit a passage of text, in a first language, extracted from a first page of a client application to a machine translation engine, the machine translation engine configured to return a machine translated text in a second language based on the passage of text, the application server further configured to generate a second page in the client application matching the first page wherein the passage of text is replaced by the machine translated text returned from the machine translation engine, the application server is further configured to parse the passage of the text for length and inclusion of words from a predetermined list and determine the machine translation engine to use for the passage of text from a plurality of machine translation engines based on the length of the passage of text and the inclusion of words from a predetermined list; and
a processor operated user interface for a local version of the client application configured to correct the machine translated text in a local version of the second page based on user input entered into the user interface for the local version of the client application of the second page and transmit the user input to the application server.

15. The system of claim 14, wherein the user interface for the local version of the client application navigates to second page through a same manner as the first page while a language setting is set to the second language.

16. The system of claim 14, wherein the local version of the second page is:
   stored locally on a client device; or
   stored on the application server and associated with a specific user account.

17. The system of claim 14, wherein the application server is further configured to submit the user input to the machine translation engine, wherein the machine translation engine is configured to translate from the second language to the first language and return a reverse translated text; and
   wherein the application server is configured to update the machine translated text in a system wide version of the second page based on the user input, the update in response to satisfaction of a character match threshold between the reverse translated text and the passage of text.

18. The system of claim 17, wherein the system wide version of the second page does not include any of:
   the local version; or
   other local versions of client applications that have automatic updates disabled.

19. The system of claim 14, wherein the application server further submits a lexicon file to the machine translation engine configured to affect generation of the machine translated text wherein a predetermined set of words contained within the passage of text are machine translated to corresponding terms indicated by the lexicon file.

20. The system of claim 14, wherein the user interface for the local version of the client application is configured to revert display of a specific segment of the machine translated text in the second language on the second page to a corresponding segment from the passage of text in the first language based upon receiving a user selection that identifies the specific segment of the machine translated text.

* * * * *